(12) United States Patent
Zeng et al.

(10) Patent No.: US 12,422,306 B1
(45) Date of Patent: Sep. 23, 2025

(54) SENSOR MULTIFUNCTIONAL BLUETOOTH FOOD PROBE

(71) Applicant: Wuhan Topos Sensor Technology Co., Ltd., Ezhou (CN)

(72) Inventors: ZhaoTing Zeng, Shenzhen (CN); Hui Zhang, Shenzhen (CN)

(73) Assignee: Wuhan Topos Sensor Technology Co., Ltd., Ezhou (CN)

( * ) Notice: Subject to any disclaimer, the term of this patent is extended or adjusted under 35 U.S.C. 154(b) by 0 days.

(21) Appl. No.: 19/174,381

(22) Filed: Apr. 9, 2025

(30) Foreign Application Priority Data

Apr. 3, 2025 (CN) .......................... 202520630921.X (51) Int. Cl.
 *G01K 1/024* (2021.01)
 *G01K 13/00* (2021.01)

(52) U.S. Cl.
 CPC ............ *G01K 1/024* (2013.01); *G01K 13/00* (2013.01)

(58) Field of Classification Search
 CPC ..... G01K 1/024; G01K 13/00; G01K 2207/02
 USPC .................................................. 374/166, 208
 See application file for complete search history.

(56) References Cited

U.S. PATENT DOCUMENTS

| 12,379,261 B1* | 8/2025 | Zeng | G01K 7/22 |
| 2025/0207979 A1* | 6/2025 | Huang | G01K 1/024 |
| 2025/0216269 A1* | 7/2025 | Li | G01K 7/22 |

FOREIGN PATENT DOCUMENTS

| CN | 117740196 A | * | 3/2024 | ............... G01K 1/00 |
| CN | 118149986 A | * | 6/2024 | |
| CN | 118190190 A | * | 6/2024 | |
| CN | 119666172 A | * | 3/2025 | ............. G01K 1/026 |
| CN | 119743736 A | * | 4/2025 | |
| LU | 508967 B1 | * | 5/2025 | ............... G01K 1/08 |

* cited by examiner

*Primary Examiner* — Mirellys Jagan
(74) *Attorney, Agent, or Firm* — JEEN IP LAW, LLC (57) ABSTRACT

A sensor multifunctional Bluetooth food probe is provided; a first sensor is provided at a front end of a probe body tube and configured to measure food temperature; the first sensor is connected to a PCB board and a main control circuit through first and second wires, the probe body tube is provided with a first charging electrode; a second sensor is provided at one end of a handle and configured to measure an environmental temperature; the second sensor is connected to the PCB board and main control circuit through third and fourth wires; the handle serves as an antenna or a second charging electrode; a switching circuit is configured to switch the third and fourth wires to a charging module or a temperature measurement module. In this application, the antenna is externally mounted and has fewer internal wires to reduce interference signals.

10 Claims, 5 Drawing Sheets

SENSOR MULTIFUNCTIONAL BLUETOOTH FOOD PROBE

CROSS-REFERENCE TO RELATED APPLICATIONS

This application claims priority to Chinese Patent Application No. 202520630921.X, filed on Apr. 3, 2025, which is hereby incorporated by reference in its entirety.

TECHNICAL FIELD

The present disclosure relates to the field of temperature probe technologies, and in particular, to a sensor multifunctional Bluetooth food probe.

BACKGROUND

Food temperature probes are used to measure an internal temperature of food, helping cooks accurately grasp the cooking progress, thereby avoiding undercooked or overcooked food, and providing a good foundation for cooking delicious food. Currently, the internal structure of temperature probes continues to be streamlined and optimized, with efforts being made to improve the accuracy and stability of food temperature probes and reduce product production costs.

The existing food probes generally have a first sensor at a front end for measuring the food temperature, and a second sensor at a tail end of the probe for measuring the environmental temperature where the food is located. An antenna is also provided inside a handle body. However, due to the presence of too many wires (sensor wires, charging electrode wires, antenna wires) inside the handle body, the antenna signal is affected, and the internal circuit is complex and easily damaged. Besides that, the existing technology also involves placing the antenna externally on the handle, but sensor wires and charging electrode wires (antenna wires) need to be provided inside the handle. There are also many wires, and the internal structure is not streamlined enough, which makes it easy to break.

Therefore, finding a suitable food probe is an urgent technical problem that technical personnel in this field need to solve.

SUMMARY

In view of this, in order to solve the problem of the independent and unstable connection wires of the antenna, temperature sensor, and charging electrode in the existing technology, this application provides a sensor multifunctional Bluetooth food probe. The external signal of the antenna is good, three wires of antenna, temperature sensor, and charging electrode are integrated, the structure is simple, the waterproof performance is good, and the service life is long.

In one embodiment, a sensor multifunctional Bluetooth food probe is provided, including a first sensor, a first wire and a second wire of the first sensor, a PCB board, a battery, a main control circuit, a switching circuit, a charging module, a second sensor, a third wire and a fourth wire of the second sensor, a communication module, an antenna, a transition connector, a handle, and a probe body tube;

where the first sensor is provided at a front end of the probe body tube and configured to measure food temperature; the first sensor is connected to the PCB board and the main control circuit through the first wire and the second wire, and the probe body tube is provided with a first charging electrode;

the second sensor is provided at one end of the handle away from the probe body tube and configured to measure an environmental temperature where the food is located; the second sensor is connected to the PCB board and the main control circuit through the third wire and fourth wire; the handle serves as the antenna or a second charging electrode;

the communication module is provided on the PCB board, is connected to the main control module through the PCB board and the antenna, and is configured to transmit temperature signals measured by the first sensor and the second sensor through the antenna in a temperature measurement mode;

the switching circuit is configured to switch the third and fourth wires of the second sensor to a charging module or a temperature measurement module.

In one embodiment, the transition connector is non-conductive, and the transition connector is provided between the probe body tube and the handle; the probe body tube, the transition connector, and the handle are coaxially provided.

In one embodiment, one end of the third wire is electrically connected to one end of the fourth wire so as to form the second sensor, the other end of the third wire and the other end of the fourth wire are connected to the main control circuit through the PCB board so as to connect to the temperature measurement module; or one end of the third wire and one end of the fourth wire are electrically connected to the handle, and the handle serves as the second charging electrode to connect to one pole of a peripheral charging power supply so as to connect to the charging module.

The second sensor is electrically connected to the handle, and the main control circuit is connected to the switching circuit, and it is switched to a charging mode or a temperature measurement mode by controlling the switching circuit.

In one embodiment, the switching circuit is switched to the charging mode, the handle serves as the second charging electrode of the charging circuit, and the probe body tube serves as a first charging electrode of the charging circuit.

In one embodiment, when the switching circuit is switched to the temperature measurement mode, temperature measurement data of the second sensor is transmitted as a sensing signal through the handle serving as the antenna.

In one embodiment, the handle is made of metal material, the handle, the third wire or the fourth wire of the second sensor forms the antenna.

In one embodiment, the transition connector is provided with one or two through holes, and the third wire and the fourth wire pass through the through holes.

In one embodiment, the switching circuit includes a circuit switching element, and the circuit switching element includes a MOS transistor or a Schottky diode.

In one embodiment, the probe body tube is connected to the transition connector through one of interference fit riveting, adhesive, or screw thread connection, and the transition connector is connected to the handle through interference fit riveting, adhesive, or screw thread connection.

In one embodiment, the transition connector is made of non-metallic insulation material.

According to the present application, a sensor multifunctional Bluetooth food probe is provided, which has a good external antenna signal; three wires of antenna, temperature sensor, and charging electrode are integrated, with a simple structure, good waterproof performance, and long service life. Furthermore, there is a cavity inside the probe body, the first sensor is provided at the front end of the probe body. The first sensor is configured to insert into food to measure the food temperature. One end of the handle away from the probe body tube is provided with the second sensor to measure the environmental temperature where the food is located. For example, when cooking grilled meat, the probe body tube is inserted into the grilled meat, and the first sensor obtains temperature information of the food. The second sensor obtains temperature information of an oven where the food is located, and the temperature information is transmitted to a terminal through the handle as the antenna. In addition, only two wires need to be provided in the handle, namely the third wire and the fourth wire. The third wire and the fourth wire are configured to connect the antenna, the second charging electrode, or the second sensor to the main control circuit and achieve corresponding functions. When charging is needed, the food probe is placed on a charger and the food probe is placed in the corresponding position, so that the first charging electrode provided on the probe body tube and the second charging electrode provided on the handle are placed in the corresponding positions, it is switched to the charging mode and started charging. When it is needed to measure the food temperature, the food probe is placed on the food, in the temperature measurement mode, temperature information obtained by the first and second sensors is transmitted to the terminal through the antenna. The sensor wires, namely the third and fourth wires, serve as wires in the charging circuit, the handle serves as the second pole in the charging circuit. For example, the second pole on the handle is a negative pole, and the first pole on the probe body tube is a positive pole. In the temperature measurement mode, the sensor wires, namely the third and fourth wires, serve as wires for the second sensor and antenna, achieving the integration of the wires for the antenna, sensor, and charging electrode in the food probe. This reduces the number of wires inside the handle, improves the stability of antenna transmission, enhances the compactness of an internal structure, and improves an anti-drop performance. Furthermore, a handle shell is made of all metal, thereby providing better waterproof performance, and the second sensor is provided at the end of the handle for faster sensing speed and more accurate temperature measurement.

BRIEF DESCRIPTION OF DRAWINGS

In order to provide a clearer explanation of the embodiments or technical solutions in the present application or existing technology, a brief introduction will be given to the accompanying drawings required for the embodiments or existing technology description. It is obvious that the accompanying drawings described below are only some embodiments of the present application. For those skilled in the art, other drawings can be obtained based on these drawings without creative work.

Numeral reference:10—first sensor; 11—first wire; 12—second wire; 20—second sensor; 21—third wire; 22—fourth wire; 30—battery; 40—PCB board; 50—main control circuit; 60—probe body tube; 61—first charging electrode; 70—handle; 71—antenna; 72—second charging electrode; 80—transitional connector; 90—communication module.

DESCRIPTION OF EMBODIMENTS

In order to enable technical personnel in this field to better understand the technical solutions in this application, the following will provide a clear and complete description of the technical solutions in the embodiments of this application in combination with the accompanying drawings. Obviously, the described embodiments are only a part of the embodiments of this application, not all of them. Based on the embodiments in this application, all other embodiments obtained by ordinary skilled persons in this field without creative work are within the protection scope of this application.

Referring to FIGS. 1, 2, 3, and 4, in one embodiment, a sensor multifunctional Bluetooth food probe is provided, which includes a first sensor 10, a first wire 11 and a second wire 12 of the first sensor 10, a PCB board 40, a battery 30, a main control circuit 50, a switching circuit, a charging module, a second sensor 20, a third wire 21 and a fourth wire 22 of the second sensor 20, a communication module 90, an antenna 71, a transition connector 80, a handle 70, and a probe body tube 60. The communication module 90 is a WIFI chip or a Bluetooth chip.

Figure 1:
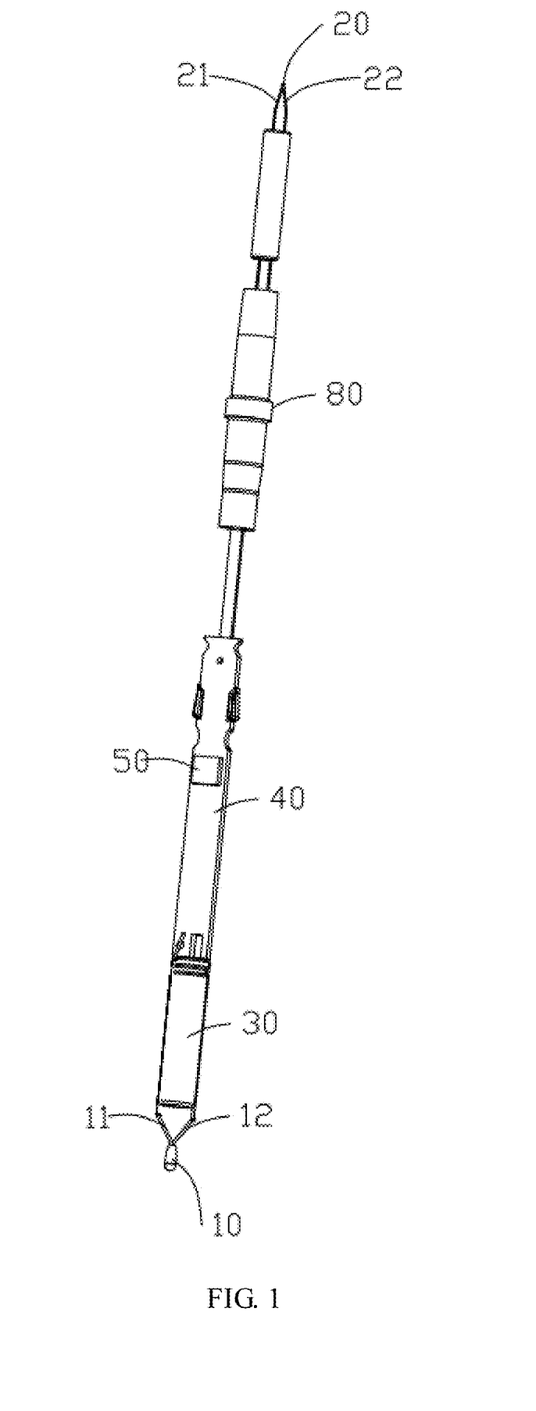
FIG. 1 is a schematic diagram of an internal structure of a sensor multifunctional Bluetooth food probe in an embodiment.
Figure 2:
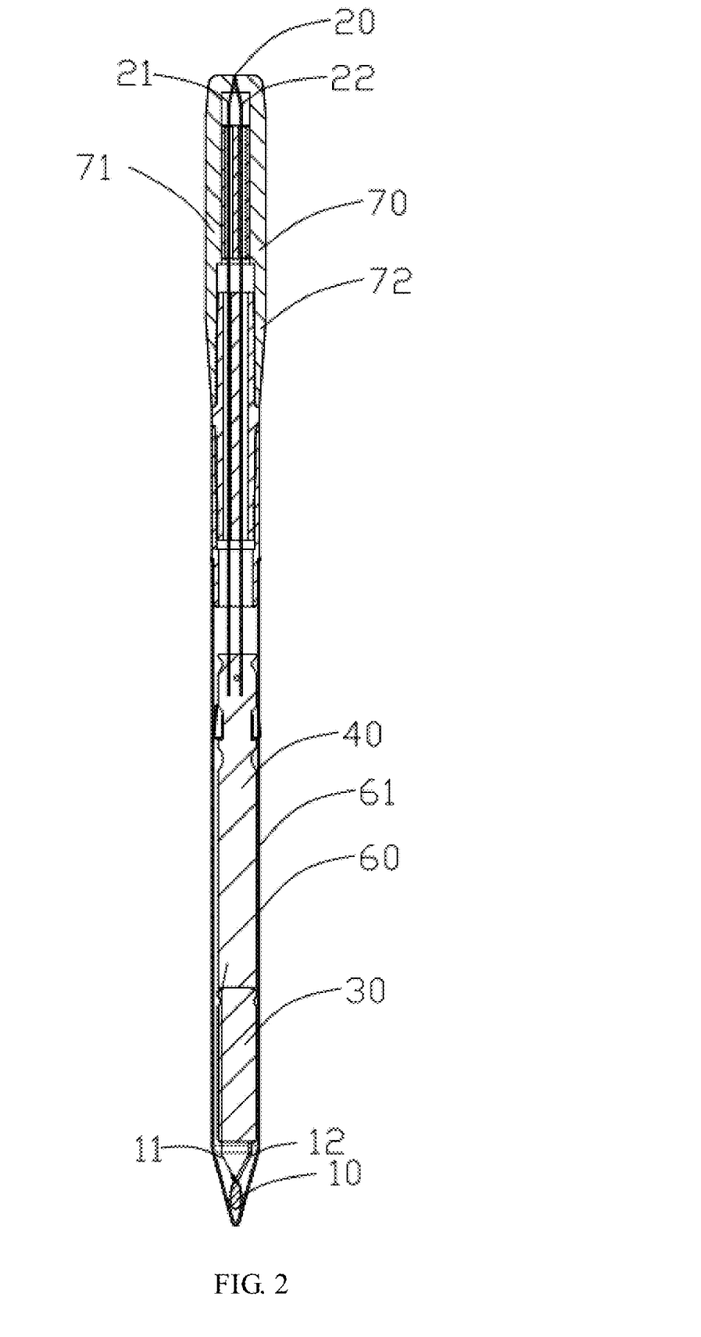
FIG. 2 is a cross-sectional view of the sensor multifunctional Bluetooth food probe in an embodiment.
Figure 3:
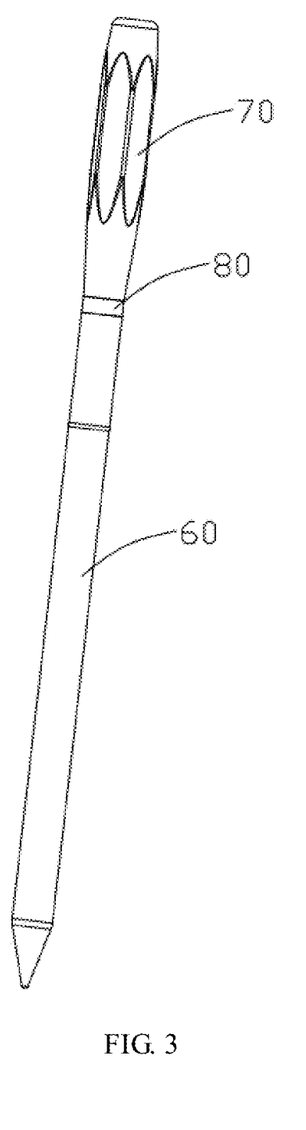
FIG. 3 is a first perspective view of the sensor multifunctional Bluetooth food probe in an embodiment.

The first sensor 10 is provided at a front end of the probe body tube 60 and is configured to measure food temperature; the first sensor 10 is connected to the PCB board 40 and the main control circuit 50 through the first wire 11 and the second wire 12. The probe body tube 60 is provided with a first charging electrode 61.

The second sensor 20 is provided at one end of the handle 70 away from the probe body tube 60 and is configured to measure an environmental temperature where the food is located. The second sensor 20 is connected to the PCB board 40 and the main control circuit 50 through the third wire 21 and the fourth wire 22. The handle 70 serves as the antenna 71 or a second charging electrode 72.

Figure 4:
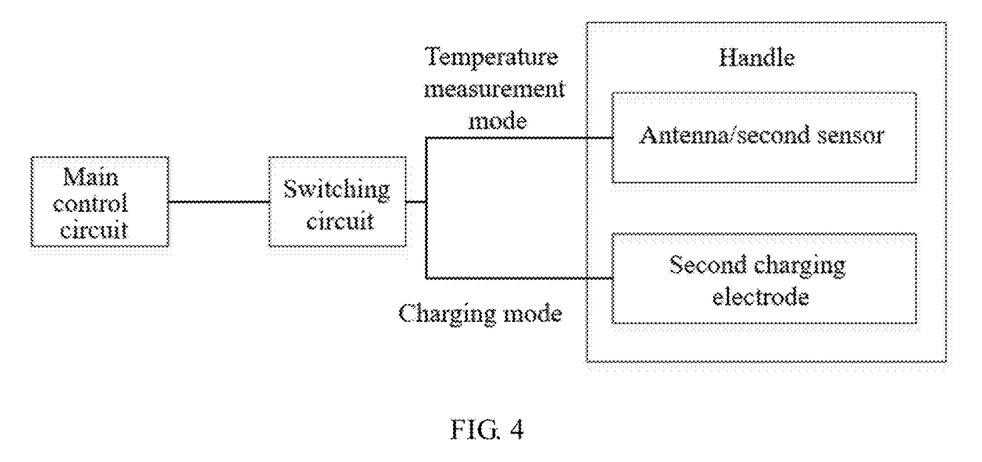
FIG. 4 is a schematic diagram of a switching circuit in an embodiment.

The switching circuit is configured to switch the third wire 21 and the fourth wire 22 of the second sensor 20 to a charging module or a temperature measurement module.

It should be noted that in Meater technology, although both the antenna 71 and the charging electrode are provided on the handle 70, the antenna 71 and the charging electrode share the same wire, and there are also many sensor wires that need to be provided, the structure is not stable enough, and the second sensor 20 is not connected to the tail end of the handle, which results in slow temperature response speed and inaccurate temperature measurement. This embodiment provides a sensor multifunctional Bluetooth food probe. The probe body tube is provided with a cavity inside, and the first sensor 10 is provided at the front end of the probe body tube 60. The first sensor 10 is configured to insert into food to measure the food temperature. At the end of the handle 70 away from the probe body tube 60, it is provided with the second sensor 20 to measure the environmental temperature where the food is located. For example, when cooking grilled meat, the probe body tube 60 is inserted into the grilled meat, and the first sensor 10 obtains temperature information of the food. The second sensor 20 obtains temperature information of an oven where the food is located, and the temperature information is transmitted to a terminal through the handle 70 as the antenna 71. Besides that, only two wires need to be provided in the handle 70, namely the third wire 21 and the fourth wire 22. The third wire 21 and the fourth wire 22 are configured to connect the antenna 71, the second charging electrode 72, or the second sensor 20 to the main control circuit 50 and achieve corresponding functions. When charging is required, the food probe is placed on a charger and the food probe in the corresponding position, so that the first charging electrode 61 provided on the probe body tube 60 and the second charging electrode 72 provided on the handle 70 are placed in the corresponding positions, and it is switched to the charging mode and started charging. When it is needed to measure the food temperature, the food probe is placed on the food, and through the temperature measurement mode, temperature information obtained by the first sensor 10 and the second sensor 20 is transmitted to the terminal through the antenna 71.

In an implementation mode, in the charging mode, sensor wires, namely the third wire 21 and the fourth wire 22, serve as wires in the charging circuit, the handle 70 serves as a second pole in the charging circuit. A second pole on the handle 70 is a negative pole, and a first pole on the probe body tube 60 is a positive pole. In the temperature measurement mode, the sensor wires, namely the third wire 21 and the fourth wire 22, serve as the wires for the second sensor 20 and the antenna 71, achieving the integration of the wires for the antenna 71, the second sensor 20, and the second charging electrode 72 in the food probe. This reduces the number of wires inside the handle 70, improves the transmission stability of the antenna 71, enhances the compactness of an internal structure, and improves an anti-drop performance. A shell of the handle 70 is made of all metal, which provides better waterproof performance, and the second sensor 20 is provided at the end of the handle 70 for faster sensing speed and more accurate temperature measurement.

It is noted that the switching circuit in this embodiment controls the switching of a circuit switching element through the main control circuit 50 to switch to the charging mode or the temperature measurement mode. The circuit switching element includes but are not limited to MOS transistors, Schottky diodes, etc.

In an implementation mode, the transition connector 80 is non-conductive. The transition connector 80 is provided between the probe body tube 60 and the handle 70, and the probe body tube 60, the transition connector 80, and the handle 70 are coaxially provided.

It should be noted that the transition connector 80 is made of ceramic material and is non-conductive, allowing the probe body tube 60 to serve as the first pole in the charging circuit and the handle 70 to serve as the second pole in the charging circuit.

In an implementation mode, one end of the third wire 21 is electrically connected to one end of the fourth wire 22 so as to form the second sensor 20, and the other end of the third wire 21 and the other end of the fourth wire 22 are connected to the main control circuit 50 through the PCB board 40, and it is connected to the temperature measurement module; or one end of the third wire 21 and one end of the fourth wire 22 are electrically connected to the handle 70, the handle 70 serves as the second charging electrode 72 and is connected to one pole of a peripheral charging power supply, and it is connected to the charging module.

It should be noted that the temperature measurement mode is formed by switching the circuit to connect to the temperature measurement module; or the charging mode can be formed by switching the circuit to connect to the charging module. Furthermore, the second sensor 20 is provided at a tail end of the handle 70, with a fast-sensing speed.

In an implementation mode, the switching circuit is switched to the charging mode, the handle 70 serves as the second charging electrode 72 of the charging circuit and the probe body tube 60 serves as the first charging electrode 61 of the charging circuit.

It should be noted that the first charging electrode 61 is a positive electrode, and the second charging electrode 72 is a negative electrode.

In an implementation mode, the switching circuit is switched to the temperature measurement mode, temperature measurement data of the second sensor 20 is transmitted as a sensing signal through the handle 70 serving as the antenna 71.

It should be noted that the second sensor 20 obtains temperature data of the environment in which the food is located, and the first sensor 10 obtains temperature data of the food. Both temperature data are transmitted as sensing signals through the handle 70 as the antenna 71.

In an implementation mode, the handle 70 is made of metal material, and the handle 70, the third wire 21 or the fourth wire 22 of the second sensor 20 forms the antenna 71.

Figure 5:
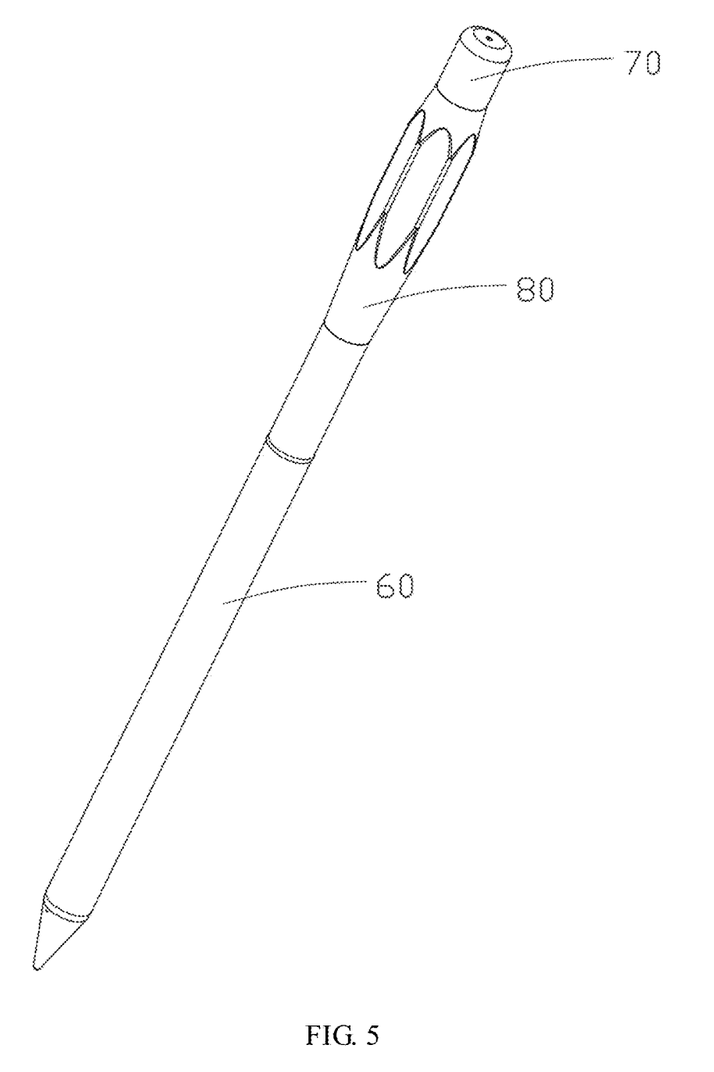
FIG. 5 is a second perspective view of the sensor multifunctional Bluetooth food probe in an embodiment.

It is noted that, as shown in FIG. 5, the transition connector 80 and the handle 70 can jointly serve as a handle body. A proportion of the transition connector 80 in the handle body can be set to be greater than that of the metal handle 70. At this time, small metal handle 70 mainly serves as the second charging electrode 72. At this time, the transition connector 80 is mainly gripped, and the third wire 21 or fourth wire 22 of the second sensor 20 serves as a part of the antenna 71.

It should be noted that the handle 70 has a cavity facing the probe body tube 60, and the end of the handle 70 away from the probe body tube 60 is closed. The handle 70 is integrally formed, with better waterproof performance and temperature resistance, and can measure higher temperatures up to 800° C.

In an implementation mode, the transition connector 80 is provided with one or two through holes, and the third wire and the fourth wire 22 pass through the through holes.

It should be noted that, in an implementation mode, the transition connector 80 is provided with two through holes, the third wire 21 and the fourth wire 22 respectively pass through the through holes, so that the third wire and the fourth wire 22 pass through the two through holes from the handle 70 and are connected to the PCB board 40 and the main control circuit 50 provided in the probe body tube 60. Or the third wire 21 and the fourth wire 22 can pass through the through holes together.

In an implementation mode, the switching circuit includes a circuit switching element, and the circuit switching element includes a MOS transistor or a Schottky diode.

It should be noted that the MOS transistor can be automatically switched between the charging mode and the temperature measurement mode. For example, in the charging mode, when the food probe is placed in the charger, it is detected that the main control is connected to the charger, and it is detected the charging signal and the MOS are turned on, the charging circuit is activated, and the temperature measurement communication circuit is cut off. In the temperature measurement mode, the food probe is removed from the charger, the charging MOS is disconnected, it is switched to the battery for power supply, the first sensor 10, the second sensor 20, and the antenna 71 are activated.

For example, by outputting high and low levels through GPIO (General-purpose input/output) of the main control circuit, a switching state of the MOS transistor is controlled. Specific logical example, in the charging mode, GPO-A=low level, GPO-B=high level→MOS1 is turned off, MOS2 is turned on. In the temperature measurement mode, GPO-A=high level, GPO-B=low level→MOS1 is conducted and MOS2 is turned off.

In an implementation mode, a voltage comparator circuit can also be configured to detect voltage changes when the charger is inserted, thereby triggering the main control circuit 50 to interrupt and switch to the charging mode. For example, when a voltage threshold is greater than a pre-set threshold, it is determined that the charger is connected.

In an implementation mode, the probe body tube 60 is connected to the transition connector 80 through one of interference fit riveting, adhesive, or screw connection, and the transition connector 80 is connected to the handle 70 through interference fit riveting, adhesive, or screw connection. In an implementation mode, it is interference fit riveting.

The second sensor 20 is welded to the handle 70, the third and fourth wires 22 of the second sensor 20 pass through the transition connector 80. The transition connector 80 is made of ceramic material, and the handle 70 is filled with ceramic glue. The handle 70 and the transition connector 80 are riveted, and the first wire 11 and the second wire 12 are welded to the PCB board 40. The third wire 21 and the fourth wire 22 are welded to the PCB board 40, and the battery is welded. The assembled components are placed into the probe body tube 60, then waterproof glue is filled with, and then the probe body tube 60 is riveted to the transition connector 80.

In an implementation mode, the transition connector 80 is made of non-metallic insulation material, and in an implementation mode, it is structural ceramic material.

It should be noted that when a component is referred to as "fixed" or "provided" on another component, it can be directly or indirectly provided on another component. When a component is referred to as "connected" to another component, it can be directly or indirectly connected to another component.

Furthermore, terms "first" and "second" are only used for a descriptive purpose and cannot be understood as indicating or implying relative importance or implying the number of technical features indicated. Thus, the features limited to "first" and "second" may explicitly or implicitly include one or more of these features. In the description of this application, the meanings of "multiple" and "several" refer to two or more, unless otherwise specified.

Note that the structure, proportion, size, etc. shown in the accompanying drawings of this specification are only for the purpose of cooperating with the content disclosed in the specification, for the understanding and reading of those familiar with this technology, and are not intended to limit the conditions that can be implemented in this application. Therefore, they do not have substantive technical significance. Any modification of the structure, change in proportion relationship, or adjustment of size should still fall within the scope of the technical solution disclosed in this application without affecting the efficacy and purpose that can be achieved.

The above description of the disclosed embodiments enables those skilled in the art to implement or use the present application. Various modifications to these embodiments will be apparent to those skilled in the art, and general principles defined in this specification can be implemented in other embodiments without departing from the spirit or scope of the present application. Therefore, the present application will not be limited to the embodiments shown in this specification, but will conform to a widest scope consistent with the principles and novel features disclosed in this specification.

What is claimed is:

1. A sensor multifunctional Bluetooth food probe, comprising a first sensor, a first wire and a second wire of the first sensor, a PCB board, a battery, a main control circuit, a switching circuit, a charging module, a second sensor, a third wire and a fourth wire of the second sensor, a communication module, an antenna, a transition connector, a handle, and a probe body tube;
   wherein the first sensor is provided at a front end of the probe body tube and configured to measure food temperature; the first sensor is connected to the PCB board and the main control circuit through the first wire and the second wire, and the probe body tube is provided with a first charging electrode;
   the second sensor is provided at one end of the handle away from the probe body tube and configured to measure an environmental temperature where the food is located; the second sensor is connected to the PCB board and the main control circuit through the third and fourth wires; the handle serves as the antenna or a second charging electrode; and
   the switching circuit is configured to switch the third and fourth wires of the second sensor to the charging module or a temperature measurement module;
   wherein the communication module is provided on the PCB board, is connected to the main control module through the PCB board and the antenna, and is configured to transmit temperature signals measured by the first sensor and the second sensor through the antenna in a temperature measurement mode.

2. The sensor multifunctional Bluetooth food probe according to claim 1, wherein the handle is made of metal material, and
   the handle, the third wire or the fourth wire of the second sensor forms the antenna.

3. The sensor multifunctional Bluetooth food probe according to claim 1, wherein the switching circuit comprises a circuit switching element, and the circuit switching element comprises an MOS transistor or a Schottky diode.

4. The sensor multifunctional Bluetooth food probe according to claim 1, wherein one end of the third wire is electrically connected to one end of the fourth wire so as to form the second sensor, and
   the other end of the third wire and the other end of the fourth wire are connected to the main control circuit through the PCB board so as to connect to the temperature measurement module; or
   one end of the third wire and one end of the fourth wire are electrically connected to the handle, and the handle serves as the second charging electrode to connect to one pole of a peripheral charging power supply so as to connect to the charging module.

5. The sensor multifunctional Bluetooth food probe according to claim 4, wherein when the switching circuit is switched to a charging mode, the handle serves as the second charging electrode of a charging circuit, and the probe body tube serves as the first charging electrode of the charging circuit.

6. The sensor multifunctional Bluetooth food probe according to claim 4, wherein when the switching circuit is switched to the temperature measurement mode, temperature measurement data of the second sensor is transmitted as a sensing signal through the handle serving as the antenna.

7. The sensor multifunctional Bluetooth food probe according to claim 1, wherein the transition connector is non-conductive, and the transition connector is provided between the probe body tube and the handle; and
the probe body tube, the transition connector, and the handle are coaxially provided.

8. The sensor multifunctional Bluetooth food probe according to claim 7,
wherein the transition connector is provided with one or two through holes, and the third wire and the fourth wire pass through the through holes.

9. The sensor multifunctional Bluetooth food probe according to claim 7, wherein the probe body tube is connected to the transition connector through one of interference fit riveting, adhesive, or screw thread connection, and the transition connector is connected to the handle through interference fit riveting, adhesive, or screw thread connection.

10. The sensor multifunctional Bluetooth food probe according to claim 9, wherein the transition connector is made of non-metallic insulation material;
wherein the communication module is a WIFI chip or a Bluetooth chip.

* * * * *